United States Patent [19]

Vieth

[11] Patent Number: 4,703,177
[45] Date of Patent: Oct. 27, 1987

[54] ARRANGEMENT FOR THE PRODUCTION OF X-RAY PICTURES BY COMPUTER RADIOGRAPHY

[75] Inventor: Michael Vieth, Eltersdorf, Fed. Rep. of Germany

[73] Assignee: Siemens Aktiengesellschaft, Munich, Fed. Rep. of Germany

[21] Appl. No.: 820,207

[22] Filed: Jan. 17, 1986

[30] Foreign Application Priority Data

Feb. 4, 1985 [DE] Fed. Rep. of Germany ....... 3503711

[51] Int. Cl.⁴ .............................................. G01T 1/105
[52] U.S. Cl. .................. 250/327.2; 250/227; 250/484.1
[58] Field of Search ............... 250/327.2, 337, 484.1, 250/366, 227; 358/294, 293

[56] References Cited

U.S. PATENT DOCUMENTS 3,775,559 11/1973 Vieri ..................... 358/294
3,916,198 10/1975 Coltman et al. ............ 250/363
4,424,590 1/1984 Ozawa ..................... 382/68

FOREIGN PATENT DOCUMENTS 182364 10/1984 Japan ................. 250/327.2
93425 5/1985 Japan ................. 250/484.1

OTHER PUBLICATIONS

"Radiation Physics" *Computed Radiography Utilizing Scanning...*, Minoru Sonoda et al., 9/83, pp. 833-838, vol. 148.
"Journal of Non-Crystalline Solids" *Magneto-Optic Light Switching...*, B. Hill, 1982, pp. 227-238, vol. 47, No. 2.

*Primary Examiner*—Janice A. Howell
*Assistant Examiner*—Constantine Hannaher
*Attorney, Agent, or Firm*—Kenyon & Kenyon

[57] ABSTRACT

An X-ray camera with a storage plate is used to generate an image to be read by a reproducer with an image reader to scan the photo-stimulated luminescence of the storage plate. Several detectors are provided, each being so correlated with several picture elements of a picture line that consecutive picture elements are each connected via a light waveguide of a first array of light waveguides to different detectors. In this arrangement, each photo-stimulated light signal of an adjacent picture element is processed by a different detector so that afterglow of the picture elements has no influence on the read-out time.

11 Claims, 9 Drawing Figures

LIGHT DETECTORS
LIGHT DETECTORS

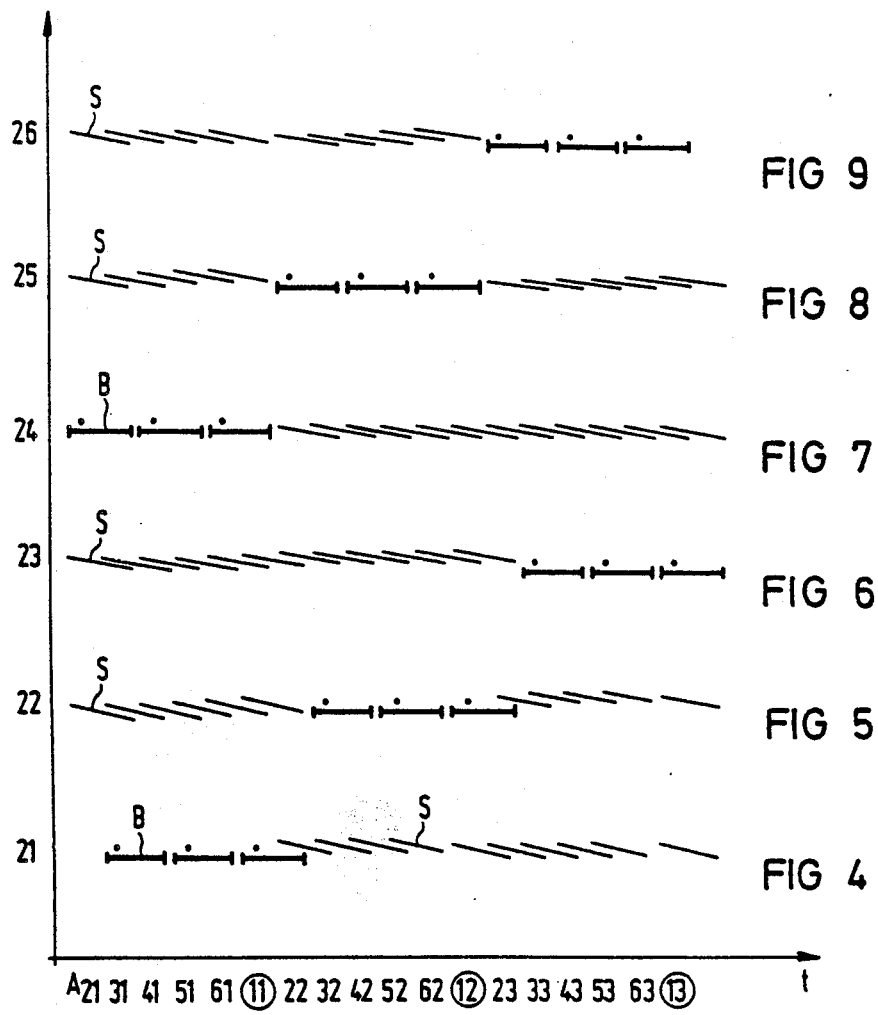

ARRANGEMENT FOR THE PRODUCTION OF X-RAY PICTURES BY COMPUTER RADIOGRAPHY

BACKGROUND OF THE INVENTION

This invention relates to computer radiography in general and more partricularly an improved detector arrangement for use in computer radiography equipment.

An arrangement for the production of X-ray pictures by computer radiography which includes a camera containing a storage plate, and an image reader to scan the photo-stimulated luminescence of the storage plate line by line with a laser is known. After transmission of the light signals obtained during scanning with light waveguides, each being coordinated with one picture element of a picture line, the light signals are converted in a detector into electrical signals which are fed to an associated image processing computer.

Thus, in digital computer radiography the image obtained by X-ray irradiation is stored on what is called a storage plate and later converted into digital electrical signals by an image reader and then made visible on a picture screen. In the storage plate, the X-rays are converted into electrical charges. The storage plate contains, for this purpose, a luminous substance cast into an organic binder and applied to a transparent carrier, generally a foil. The image reader transforms the areal pattern of different X-ray intensities into corresponding electrical signals which are fed to an image processor via an analog-to-digital converter. After conversion into analog signals again, the image can be fed to the picture screen.

Stimulated by high-energy rays, in particular a red laser, the storage plate is scanned, and the photo-stimulated luminescence is fed point by point sequentially, each by means of a light waveguide, to a common photomultiplier and to an amplifier. The laser beam is focussed on the storage plate by means of an optical system and deflected over the line by means of a rotating mirror. The storage plate is shifted stepwise relative to the laser beam fan so that the entire image is scanned line by line by the laser beam (Radiology, Vol. 148, Sept. 1983, pages 833 to 838).

In another known arrangement, the rays of a common radiation source for the photo-stimulating luminescence are transmitted by means of a multiplicity of light waveguides, and this radiation is relayed with magneto-optical switches in the picture line by a light switching array (LISA) (Journal of Non-Crystalline Solids 47, 2 (1982) pages 227 to 238).

The stored, areal image pattern of the X-ray picture is converted in the image reader into a sequence of electrical signals. The image reader, thus, acts as an areal transformer. The photo-stimulated radiation can be measured 'in reflection' on the side facing the scanning laser beam, or 'in transmission' on the reverse side of the storage plate. The red light of the laser releases blue light in the individual picture elements of the luminous storage substance. Generally, so-called luminous phosphors, e.g., europium-activated barium fluoride compounds BaFX:Eu, serve as the luminous storage substance. Therein, X are suitable additives such as chlorine, bromine or iodine. The use of chlorine as an additive is well suited because it is relatively easy to process, although the duration of its luminescence of approximately 7 $\mu$s is relatively long as compared to that of bromine of 0.8 $\mu$s and that of iodine of only 0.6 $\mu$s, for instance.

If, in scanning, an afterglow of the picture elements occurs whose duration corresponds to the scanning time for several adjacent picture elements, the radiation signals of the momentarily stimulated picture element and the afterglow of the previously stimulated picture elements are superposed in the receiver. This falsifies the reproduction of the radiation distribution, and resolution and dynamics are impaired. If, in scanning, the stimulating laser light is scattered, adjacent picture elements can be stimulated to luminesce in addition to the momentarily measured picture element. The emitted signals of all picture elements affected are, in turn, subject to scattering and are received and superposed by the same receiver. This adds to the worsening of resolution and dynamics of the radiation image.

Therefore, it is an object of the present invention to provide an arrangement of the kind described above in which an unfavorable influence of afterglow and, if applicable, also of the scattered light of the picture elements upon the reproduction of the stored X-ray picture is made impossible.

SUMMARY OF THE INVENTION

According to the present invention, this problem is solved by providing several detectors to each of which several picture elements of a picture line are assigned such that adjacent picture elements are coupled via light waveguides to different detectors. The radiated light signal of each successive picture element in the picture line is, thus, processed by a detector different from that associated with adjacent picture elements, the signal of which can be sampled almost at random by a succeeding electronic system. This practically eliminates the influence of afterglow and the influence of light scatter. Photomultipliers may preferably be provided as detectors. It is expedient to coordinate with each detector a peak value holder (sample and hold circuit). The output signals of the sample and hold circuits are scanned by a multiplexer.

In a special embodiment of the present invention, an unfavorable influence of both light scatter and afterglow are prevented in that several consecutive picture elements of the picture line form a group and an additional array of light waveguides is provided to feed the laser beam to the individual picture elements of the picture line. The faces of the first ends of the light waveguides facing the laser beam form a scanning line and the other ends are each connected to a picture element of a different group. Consequently, the laser beam is successively fed to picture elements of the picture line which are not adjacent and are thus not reached by the scattered light of the preceding light element.

It is also possible to replace the additional light waveguide array scanned by the laser radiation source with a line of radiation sources which can be addressed electrically with almost no lag and in which a separate radiation source is assigned to each picture element. On the read-out side, each picture element of the picture line is then associated with its own detector. The picture line is then read in accordance with the addressing pattern of the radiation sources of the scanning side.

BRIEF DESCRIPTION OF THE DRAWINGS

FIGS. 4 to 9 are timing diagrams of the signal formation.

DETAILED DESCRIPTION

Figure 1:
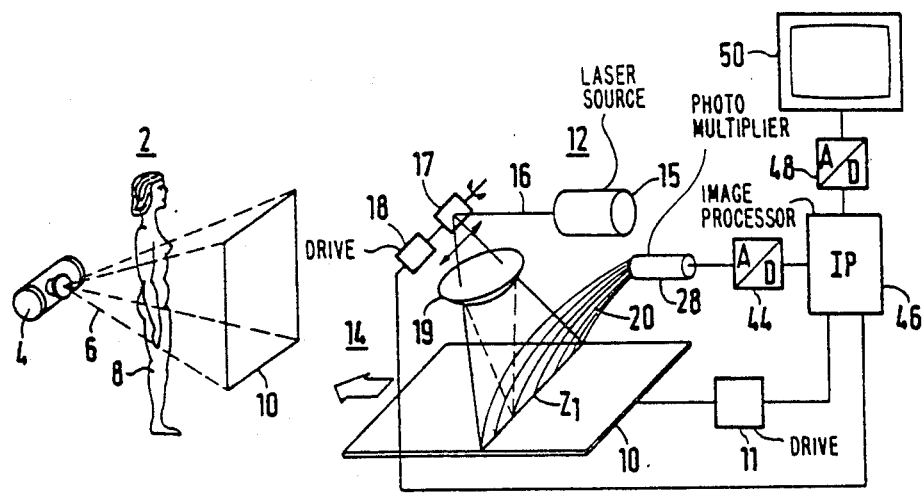
FIG. 1 is a schematic of an arrangement for the production of X-ray pictures by computer radiography according to the state of the art.

In a known embodiment of a computer radiograph as shown in FIG. 1, the arrangement consists essentially of a camera 2 and a reproducer 12. The camera 2 contains an X-ray source 4 whose X-rays 6 irradiate an examination object such as a human body 8, and a so-called storage plate 10. Storage plate 10 consists essentially of a transparent foil coated on one flat side with a photostimulatable luminous substance generally consisting of luminous phosphor embedded in an organic binder. The storage plate 10 receives the irradiation picture of the body 8 which is made visible by a reproducer 12 on a picture screen 50 or may also be printed out by a printer, not shown in the Figure.

For the read-out of the stored picture, the storage plate 10 is inserted into the reproducer 12 which contains a scanner 14 with a laser radiation source 15 and a deflector for the laser beam, such as a rotating mirror 17 with a drive 18. By means of an optical system, shown as a focussing lens 19, the laser beam 16 can be focussed on a point of a picture line $Z_1$ of the storage plate 10 and deflected point by point over the length of the picture line $Z_1$ by means of a rotating mirror 17. The correlation of the individual electrical signals with the picture elements of the picture line $Z_1$ is obtained by appropriately coupling an image processing computer 46 to both the drive 18 of the rotating mirror 17 and to a drive 11 for the movement of the storage plate 10 indicated in the Figure by an arrow without reference symbol.

The red laser beam 16 releases in the picture elements of the picture line $Z_1$ a blue luminescence radiation which is fed by means of light waveguides 20 to a photomultiplier 28 and transformed into electrical signals. Via an analog-to-digital converter 44, these electrical signals are fed to a computer configured as an image processor 46 which takes over the synthesis of the picture. After converion of the signals in a digital-to-analog converter 48, the picture can be displayed on the picture screen 50. During the read-out of the individual picture elements of the picture line $Z_1$ the speed of the beam deflection by the rotating mirror 17 and, hence, the read-out time for the entire radiation image is limited by the fact that the signal of a succeeding picture element can also be scanned only when the afterglow of the preceding picture element has come to an end.

Figure 2:
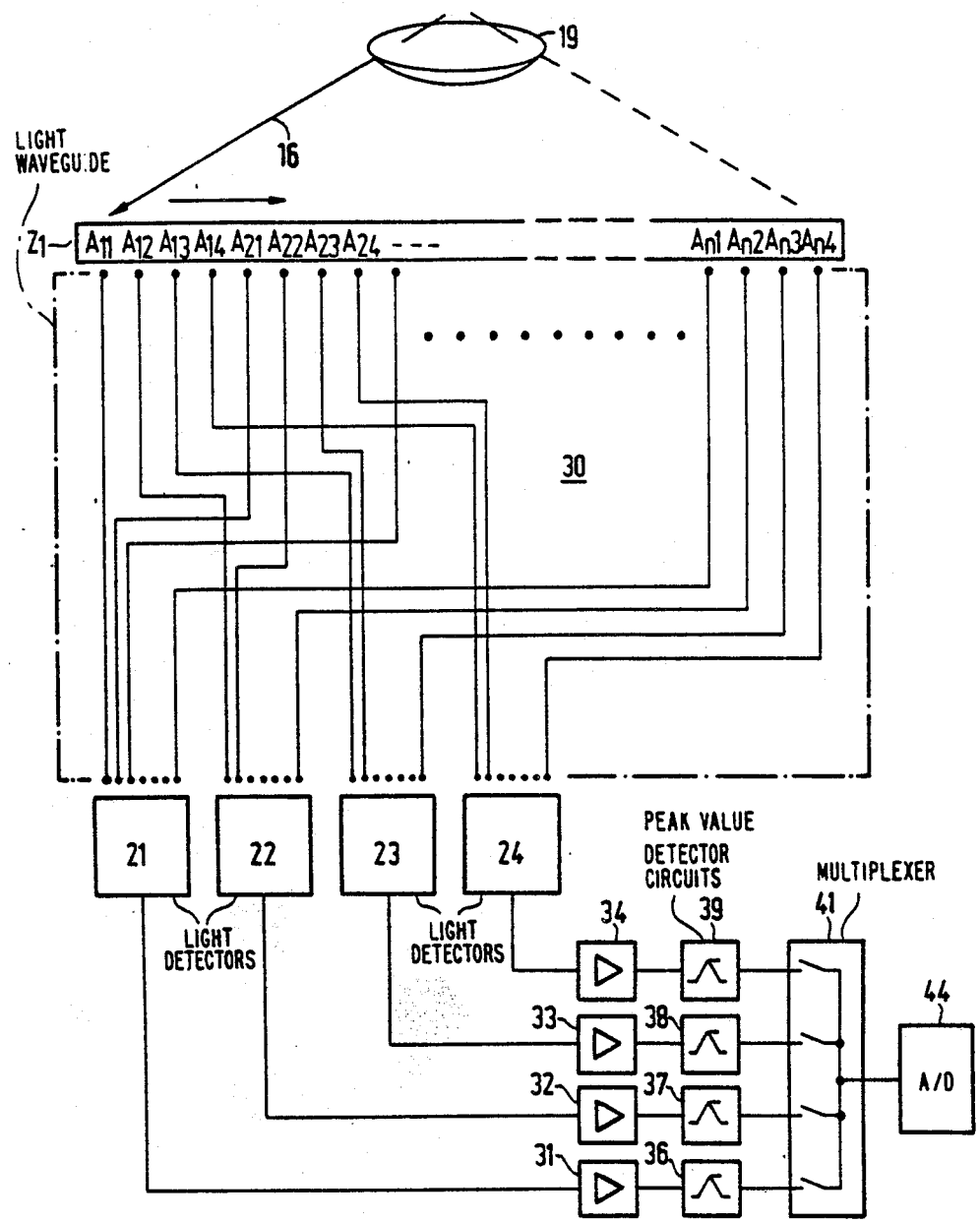
FIGS. 2 and 3 each illustrate schematically an embodiment according to the present invention with light waveguides.

In the embodiment of an arrangement for the production of X-ray pictures by computer radiography according to the present invention, as shown in FIG. 2, the light signals released in the individual picture elements of the picture line $Z_1$ are each also received by a light waveguide 30. However, several large-area photodetectors 21 to 24 are provided to each of which separated light signals are fed. The picture elements of the picture line $Z_1$ are divided into groups of adjacent picture elements, of which two groups are shown in FIG. 2 at the start of the picture line $Z_1$ and designated $A_{11}$, $A_{12}$, $A_{13}$, $A_{14}$ and $A_{21}$, $A_{22}$, $A_{23}$, $A_{24}$. The picture line may preferably contain a great number of picture elements, e.g. 1000 picture elements, of which the last group is designated $A_{n1}$, $A_{n2}$, $A_{n3}$, $A_{n4}$. The light signal released in the picture element $A_{11}$ is fed to the detector 21 by the assigned light waveguide 30. The light signal released in the next picture element $A_{12}$ is received by the detector 22 and the light signal from picture element $A_{13}$ by the detector 23. Similarly the detector 24 receives the light signal released in the picture element $A_{14}$. To amplify the signals emitted by the detectors, additional amplifiers 31 to 34 may expediently be provided, each of which are followed by an electronic peak value detector 36 to 39, i.e., a sample and hold circuit. The output signals of the detectors 21 to 24 are each scanned successively by a multiplexer 41 via the electronic components 34 and 39 and fed to the analog-to-digital converter 44. In this embodiment, the laser beam 16 can be conducted through the focussing lens 19 from the picture element $A_{11}$ to the next picture element $A_{12}$, for example, before the afterglow of the picture element $A_{11}$ has come to an end. For this purpose, the multiplexer 41 samples the detector 22 via the output of the sample and hold circuit 37 before the afterglow of the picture element $A_{11}$ has come to an end. The transit time of the laser beam 16 through the picture elements $A_{11}$ to $A_{n4}$ of the picture line $Z_1$ and, hence, the read-out time of the storage plate 10 is, thus, reduced accordingly.

Figure 3:
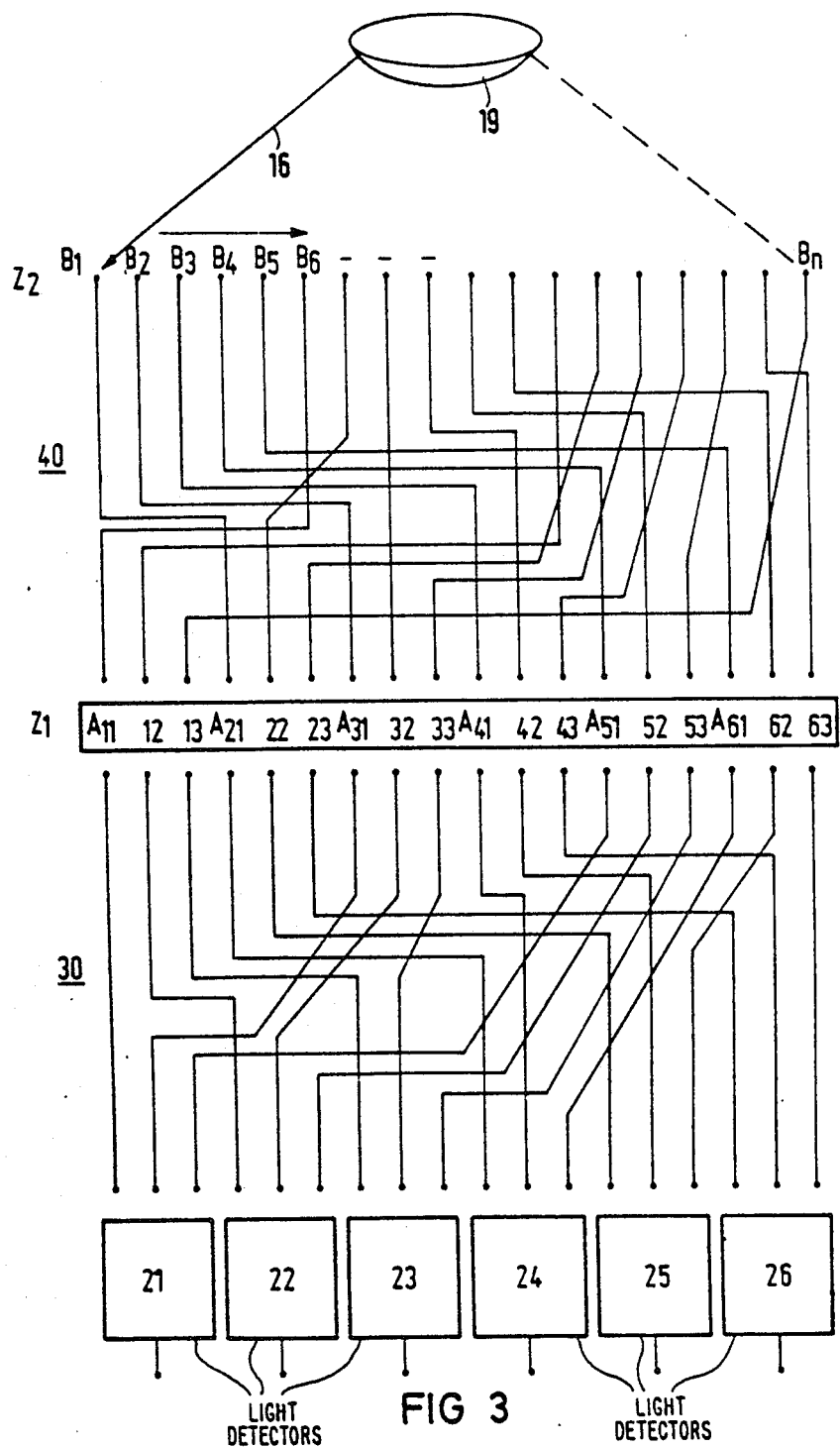

In the embodiment according to FIG. 3, six detectors 21 to 26 are assigned to the picture line $Z_1$ The picture elements of the picture line $Z_1$ are organized in groups of three picture points each, the first group being designated $A_{11}$, $A_{12}$, $A_{13}$ and the second group $A_{21}$, $A_{22}$, $A_{23}$, while the third group has the designation $A_{31}$, $A_{32}$, $A_{33}$. Similarly the fourth, fifth and sixth groups have the desigations $A_{41}$, $A_{42}$, $A_{43}$, $A_{51}$, $A_{52}$, $A_{53}$ and $A_{61}$, $A_{62}$, $A_{63}$. The picture elements of the first group $A_{11}$, $A_{12}$, $A_{13}$ are connected to the first three detectors, 21, 22, 23, respectively. Similarly, the picture elements of the second group $A_{21}$, $A_{22}$, $A_{23}$ are connected to the further detectors 24, 25 and 26, respectively. The picture elements of the third group A 31 to 33 are connected to the first detectors 21, 22 and 23 and the picture elements of the fourth group $A_{41}$ to $A_{43}$ again to the further detectors 24, 25 and 26. In a corresponding manner, the light signal of an almost arbitrary number of picture elements can each additionally be fed to one of the detectors 21 to 26.

In this special embodiment of an arrangement for the production of X-ray pictures by computer radiography it is possible, in addition, to exclude the influence of the light scatter of the picture elements of the picture line $Z_1$ in that, even while the picture line $Z_1$ is being scanned by the laser beam 16 via the optical system 19, the laser light is successively fed to picture elements of the picture line $Z_1$ which are not in consecutive order, but are alternately assigned to a next group. For this purpose an additional light waveguide array 40 is provided on the scanning side, one end of which faces the laser beam 16. These ends are designated $B_1$ to $B_n$ and form a scanning line $Z_2$ by being arranged linearly with, e.g., equal spacings. The other end of each of these light waveguides is connected to a picture element of one of the groups of the picture line $Z_1$. The stimulating light of the laser beam 16 is, thus, conducted from the end $B_1$ to the picture element $A_{21}$ of the picture line $Z_1$. Similarly, the red light of the laser beam 16 reaches the picture element $A_{31}$ of the next group in the picture line $Z_1$ from the adjacent end $B_2$ of the scanned line. From the end $B_3$ of the third light waveguide, the light of the laser beam 16 arrives at the picture element $A_{41}$ of the next group of picture elements in the picture line $Z_1$. In the same way the laser light of the laser beam 16 is conducted from the ends $B_4$ and $B_5$ of the scanned line $Z_1$ to the picture elements $A_{51}$ and $A_{61}$, respectively. From the end $B_6$ of the scanned line $Z_2$ the laser light of the laser beam 16 is conducted to the picture element $A_{11}$ of the picture line $Z_1$. Consequently, the scan signal of the laser beam 16 successively reaches picture elements of the picture line $Z_1$ which are removed from each other by several picture elements and whose number is determined by the group. The scattered light of a picture element, e.g., of picture element $A_{21}$, can, thus, have no effect on a detector signal taken from the adjacent picture elements, e.g., $A_{13}$ and $A_{22}$ or $A_{12}$ and $A_{23}$.

In the particularly advantageous embodiment illustrated shown, feeding the scan beam from the end $B_1$ in the scan line $Z_2$ does not begin with the first picture element $A_{11}$ of the first group of picture elements, but rather with the first picture element $A_{21}$ of the second group of picture elements. Subsequently, the picture elements $A_{31}$, $A_{41}$, $A_{51}$, $A_{61}$, $A_{11}$ are all struck by the stimulating laser light and the emitted luminescence light transmitted by array 30 to the detectors 21 and 24 while the scattered light is conducted to the detectors 22, 23, 25, 26. Due to this preferred embodiment of the element arrangement, the two elements $A_{61}$ and $A_{11}$, located in the margin area of line $Z_1$, are stimulated last. These elements have fewer adjacent elements which can be reached by the scattered light. Therefore, the detectors 22 and 25 are no longer occupied by scattered light so that these detectors can subsequently absorb alternately the emitted luminescence radiation of the picture elements $A_{22}$, $A_{32}$, $A_{42}$, $A_{52}$, $A_{62}$, $A_{12}$ without delay due to the afterglow of the scattered light while the scattered light of these elements is being conducted to the detectors 21, 23, 24, 26. Finally, the emitted luminescence radiation of the picture elements $A_{23}$, $A_{33}$, $A_{43}$, $A_{53}$, $A_{63}$, $A_{13}$ is conducted alternately to the detectors 23 and 26 in the same manner, while the scattered light impinges the detectors 21, 22, 24, 25.

In the timing diagrams of the FIGS. 4 through 9, the picture element signals B and the scattered light signals S of the individual picture elements of the picture line $Z_1$ are plotted in their time sequence in which they are fed to the detectors 21 to 26. The picture element signals B are shown in bold lines while the scattered light signals S are indicated by the thin lines. The length of the lines corresponds to the duration of the respective afterglow. According to the diagram, the detector 24, for instance, receives its picture element signal B from the picture element $A_{21}$ of the picture line $Z_1$ which is defined by the laser beam via the end $B_1$ of the scanned line $Z_2$ through the light waveguide of the light waveguide array 40. At the same time, the detectors 23 and 25 receive a scattered light signal from the picture elements $A_{13}$ and $A_{22}$, and the detectors 22 and 26 receive scattered light from the picture elements $A_{12}$ and $A_{23}$, respectively. This scattered light S, however, can have no influence on the electrical signal formed because only the detector 24 is being sampled. Subsequently, the detector 21 is sampled, which receives its picture element signal B from the picture element $A_{31}$ of the picture line $Z_1$, while the detectors 22, 23 and 25, 26 receive the scattered light S of the adjacent picture elements. The afterglow of the picture element $A_{21}$ during this time has no influence on the electrical signal formed either, because the detector 24 is not being sampled during this time. Each sampling is indicated in the form of a dot over the bold picture element signal line. The next picture element signal B is furnished to the detector 24 by the picture element $A_{41}$, which received its stimulation from the end $B_3$ of the scanned line $Z_2$. Even during the afterglow of this signal, the detector 21 is sampled. It received its picture element signal B from the picture element $A_{51}$, which had been stimulated by the end $B_4$ of the scanned line 2. The next signal is furnished by the picture element $A_{61}$ to the detector 24 again, and then the picture element $A_{11}$ furnishes its signal to the detector 21. The detector 25 receives the next picture signal element B from the picture element $A_{22}$, receiving its signal several times alternating with the detector 22. In the same manner, the picture element signals B are also furnished to the detectors 23 and 26 in alternating sequence. Thus, the individual detectors 21 to 26 are sampled independently of both the afterglow of the picture elements $A_{11}$ to $A_{63}$ of the picture line $Z_1$ and of the scattered light of the individual picture elements.

Since the order of the picture elements read in no longer corresponds to their original arrangement in the line $Z_1$, a rearrangement of the measured values can be performed in the computer memory for a subsequent image processing in the computer.

In a particularly advantageous embodiment of the arrangement for the production of X-ray pictures, the first array of light waveguides 30 can also be replaced by an array of light-sensitive detectors whose individual detectors are of the size of the picture elements of the picture line $Z_1$ to be registered, and in which, according to the embodiment of FIG. 3, predetermined, non-adjacent detectors are interconnected electrically and are sampled in a predetermined order.

In addition, the second array of light waveguides 40 whose ends $B_1$ to $B_n$ form the scan line $Z_2$, and the scan radiation formed by the laser beam 16 can be replaced by a line of individual radiation sources which can be activated almost without lag, preferably a line of light-emitting diodes, in particular luminescence diodes so that each one of the picture elements $A_{11}$ to $A_{63}$ of the picture line $Z_1$ can be stimulated by a single radiation source. The activation may occur in the order according to the embodiment of FIG. 3, for example.

What is olaimed is:

1. An arrangement for the production of X-ray pictures by computer radiography comprising:
   (a) a camera containing a storage plate,
   (b) a reproducer including an image reader for sequentially scanning the photo-stimulated luminescence of the storage plate line by line and picture element by picture element to generate light signals,
   (c) a plurality of detectors for conversion of the light signals into electrical signals, to each of which detectors several non-adjacent picture elements of a picture line are assigned,
   (d) an associated image processing computer for processing the electrical signals, and
   (e) a first array of light waveguides coupling the light signals from the several non-adjacent picture elements to their assigned detectors.

2. The arrangement according to claim 1, wherein said detectors comprise photomultipliers.

3. The arrangement according to claim 1, wherein said detectors comprise diodes.

4. The arrangement according to claim 1, and further including a sample and hold circuit following each detector.

5. The arrangement according to claim 4, wherein: several adjacent picture elements of each picture line form a group; and said image reader comprises a scanning laser, and further including; an additional array of light waveguides feeding the laser beam to the individual picture elements, the faces of the first ends of said additional array of light waveguides facing the laser beam to form a scanning line, and the other ends of light waveguide which are adjacent in said scanning line each correlated with picture element of a different group.

6. An arrangement for the production of X-ray pictures by computer radiography, comprising a camera containing a storage plate, a reproducer with an image reader for the read-out of the photo-stimulated luminescence of the storage plate in the picture elements of picture lines, a plurality of radiation sources forming a scanning line having elements correlated with the picture elements of a picture line and means for sequentially energizing the radiation sources without lag according to a predetermined pattern, the picture elements of the picture line being organized into groups to each of which groups is assigned a common detector.

7. The arrangement according to claim 6, wherein luminescence diodes are used as radiation sources.

8. The arrangement according to claim 7, wherein a separate detector is assigned to each picture element.

9. The arrangement according to claim 6, wherein a separate detector is assigned to each picture element.

10. An arrangement for the production of X-ray pictures by computer radiography according to claim 6 wherein the predetermined pattern is determined in accordance with the energization of non-adjacent radiation sources being transmitted to adjacent picture elements of the picture element line.

11. An arrangement for the production of X-ray pictures by computer radiography according to claim 6 wherein the picture elements of the picture line are organized into groups of several non-adjacent picture elements.

* * * * *